July 9, 1957
C. E. ATKINS
2,798,964
LIGHT SENSITIVE CONTROL CIRCUIT
Filed Oct. 5, 1953
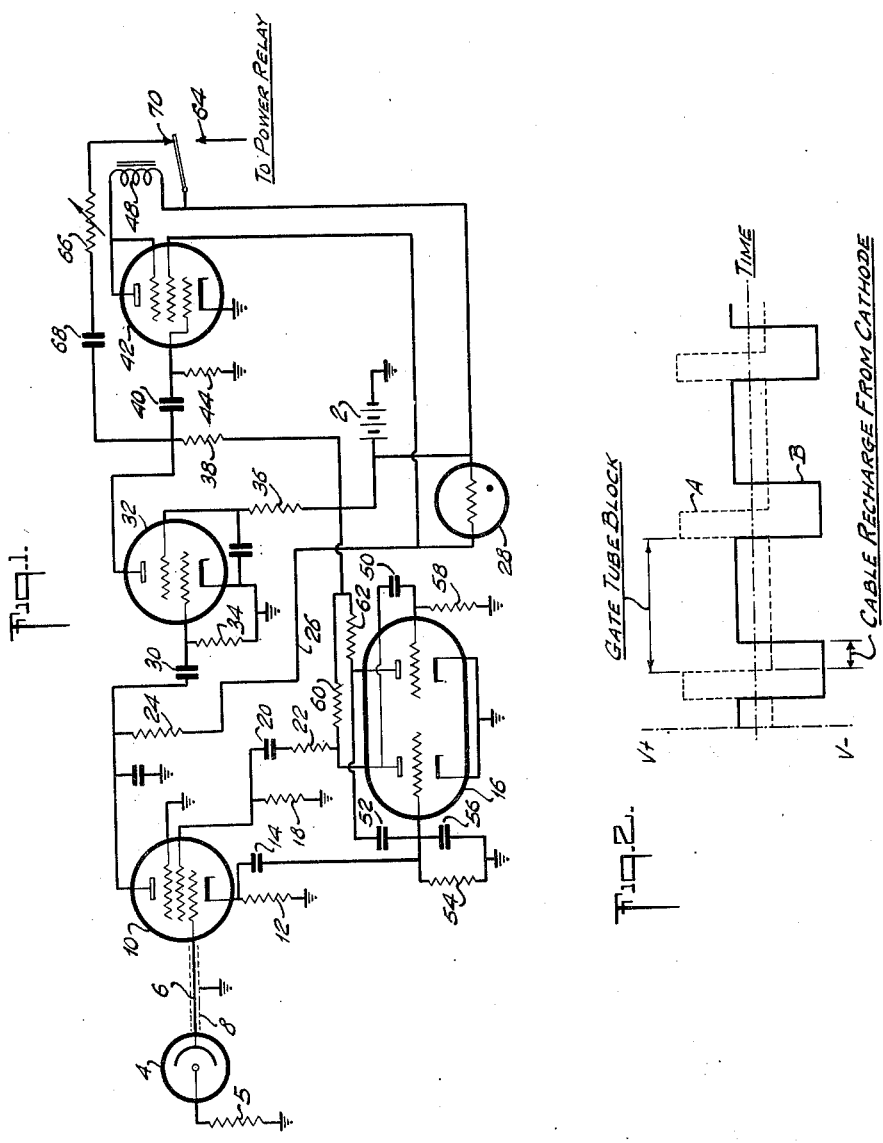
INVENTOR
CARL E. ATKINS
BY
Eyre, Mann & Burrows
ATTORNEYS United States Patent Office 2,798,964
Patented July 9, 1957

2,798,964

LIGHT SENSITIVE CONTROL CIRCUIT

Carl E. Atkins, Bloomfield, N. J., assignor to Tung-Sol Electric Inc., Newark, N. J., a corporation of Delaware Application October 5, 1953, Serial No. 384,297

5 Claims. (Cl. 250—214)

The present invention relates to photoelectric control circuits and more particularly to circuits adapted for control of the dimming switch of an automobile headlight system in response to reception of light from headlamps of approaching cars. The control circuit of the present invention is of the general type disclosed and claimed in my co-pending applications, Serial No. 375,236, filed August 19, 1953; Serial No. 375,177, filed August 19, 1953, now abandoned, and Serial No. 326,809, filed December 19, 1952, now Patent No. 2,730,629.

In the circuits of the said applications, as well as in the circuit of the present invention, a simple two-electrode photo-electric tube is employed as the light sensitive element. One electrode of the photo-electric tube is connected to a gate tube and to current accumulating means. The gate tube is intermittently pulsed and when pulsed the current through the tube depends upon the condition of charge of the accumulating means. Assuming no light incident on the photo cathode of the photo-electric device, the accumulating means becomes negatively charged from the cathode of the gate tube when the tube is pulsed and this charge on the accumulating means blocks the gate tube. If light is incident on the photo cathode of the photo-electric tube, the negative charge accumulated by the accumulating means leaks off in the intervals between pulsations of the gate tube, thereby permitting current to flow through the gate tube to create negative pulses for application to an alternating current amplifier, the magnitude of the pulses being dependent upon the condition of charge of the accumulating means. The output of the alternating current amplifier in the present circuit, as in those of my prior applications, is delivered to a relay control tube for control of a relay, the relay being normally energized and deenergizing when the light incident on the photo-electric tube reaches a predetermined value. The present circuit, also as in the earlier circuits, includes means for increasing the sensitivity of the circuit after the relay has been deenergized to initiate dimming of the lights. This increase in sensitivity is important to prevent return to high-beam conditions when the approaching car dims its lights. It is also important that when light ceases to fall on the photo-electric tube that high-beam conditions be promptly restored. The time required for such restoration of high-beam conditions depends primarily upon the magnitude of the accumulating means. When the photo-electric tube and gate tube are mounted in close proximity, the accumulating means comprises only the inherent capacity between the electrodes of the photo-electric tube and between the electrodes of the gate tube. Quick restoration of normal conditions in this case is assured. It is not always practicable to place these tubes close together, in order to maintain the capacity of the accumulating means at a minimum value.

The object of the present invention is to reduce the time required for restoration to high-beam conditions in an installation wherein the photo-electric and gate tubes are physically remote and the accumulating means comprises a shielded lead connecting electrodes of the tubes in addition to the inherent capacity between the electrodes thereof. The present invention permits the location of the gate tube physically remote from that of the photo-electric tube without sacrifice in the length of time required for restoration of high-beam conditions.

Briefly, the quick response of the circuit to absence of light is achieved by applying pulses to different electrodes of the gate tube of such periodicity and duration as to provide recharging periods for the accumulating means during which the gate tube is blocked irrespective of the condition of charge of the accumulating means. More specifically the gate tube is a pentode the control grid of which is connected through a grounded cable to the photo cathode of the photo-electric tube, the cathode of which is normally operated at above ground potential but is periodically pulsed to permit current through the tube, the suppressor grid of which is grounded and the screen grid of which is negatively biased but is positively pulsed in synchronism with the negative pulsing of the cathode but for shorter periods. Thus the potential of the screen grid is so controlled that for part only of each negative pulse on the cathode can the gate tube conduct, the other part of each negative pulse on the cathode occurring during negative biasing of the screen grid to prevent conduction while permitting rapid recharge of the accumulating means.

For a better understanding of the invention and of a circuit embodying the same, reference may be had to the accompanying drawing of which:

Fig. 1 is a schematic diagram of a circuit embodying the invention and adapted for control of the dimming switch of an automobile, and Fig. 2 is a graph explanatory of the keying pulses applied to the cathode and to the screen grid of the gate tube of the circuit of Fig. 1.

The circuit of Fig. 1 is intended for operation from a twelve-volt car-carried battery indicated at 2. The photo-electric tube 4 which may be a 930 or a 925 has its anode connected through a 40 megohm resistor 5 to ground and its cathode connected through a lead 6 provided with a grounded shield 8 to the No. 1 or control grid of a pentode 10 which may be, for example, a 6AK6. The cathode of the gate tube is connected through a resistor 12 of about 100 kilohms to ground and through a condenser 14 to the control grid of the first half of a double triode 16, the double triode forming part of a multivibrator circuit for impressing negative pulses upon the cathode of the gate tube. The screen grid of the gate tube is connected through a resistor 18 to ground to provide a negative self-bias and through a condenser 20 and resistor 22 to the anode of the first half of the double triode 16 for application of positive pulses from the multivibrator circuit to the screen grid. The suppressor grid of the gate tube 10 is grounded and the anode is connected through a dropping resistor 24 of about 22 megohms to a line 26, the voltage of which is maintained at approximately eight volts by virtue of a ballast tube 28 connected between the line 26 and the positive terminal of the battery 2. The anode of the gate tube 10 is also connected through a condenser 30 to the control grid of an amplifier tube 32 which may be and preferably is a 6AR5. The control grid of the amplifier 32 is provided with a bias resistor 34 and the cathode of the tube is grounded. The screen grid of the amplifier 32 is connected to the positive terminal of the battery 2 through a resistor 36 of about 330 kilohms. The anode of the amplifier 32 is connected to the positive terminal of battery 2 through a dropping resistor 38 of about 220 kilohms and through a condenser 40 to the control grid of a relay control tube 42 which may be a 6AS5. A grid bias resistor 44 is provided for the control grid of the relay control tube 42. The No. 2 grid of the tube 42 is connected to the eight-volt line 26 and the anode and No. 3 grid of the tube 42 are connected together and through the winding of a relay 48 to the positive terminal of the battery 2.

The multivibrator for impressing the negative pulses upon the cathode of the gate tube and the positive pulses on the screen grid of the gate tube comprises the double triode 16 with the connections now to be described. The anode of the first half of the tube is connected through a condenser 50 to the control grid of the second half of the tube and the anode of the second half of the tube is connected through a condenser 52 to the control grid of the first half of the tube. An RC network comprising a resistor 54 in parallel with a condenser 56 is connected between ground and the control grid of the first half of the tube. A bias resistor 58 is provided for the control grid of the second half of the tube and potential dropping resistors 60 and 62, each of about 33 kilohms, are provided for the anodes of the double triode. The cathodes of the double triode are grounded.

With the above described circuit the relay control tube 42 is normally conducting to maintain energized the relay 48 and to maintain open over a back contact 64 of the relay the circuit of a power relay (not shown) for operation of a dimming switch. The amplifier tube 32 is normally passing a steady current and the gate tube 10 is normally non-conductive during intervals between application of negative pulses to the cathode of the gate tube from the multivibrator circuit. When a negative pulse is applied to the cathode of the gate tube, electrons will flow to the control grid and, assuming that the screen grid is negatively biased, no current will flow through the gate tube. The cable capacitance comprising the lead 6 and grounded shield 8 will become negatively charged and this charge, in the absence of light falling on the photo cathode cannot dissipate through the photo-electric tube. Accordingly, on subsequent negative pulses to the cathode, the gate tube will continue to be blocked irrespective of the potential of the sreen grid. However, when light from an approaching car falls on the photo cathode of the photo-electric tube 4, the negative charge of the cable capacitance will leak off at a rate determined by the intensity of the light. Accordingly at the next negative pulse on the cathode of the gate tube, the tube will conduct, assuming the screen grid positive, to create a negative voltage pulse at the anode of the gate tube of a magnitude which is a function of the intensity of light. By timing the positive pulses from the multivibrator to the screen grid so that they occur during each negative pulse, but have a shorter duration, there will be a period during each negative pulse on the cathode that the tube can conduct and a period within which the tube cannot conduct, but the cable capacitance can be recharged. This is graphically illustrated in Fig. 2 wherein the dotted line "A" indicates the positive pulses to the screen grid and the solid line "B" indicates the negative pulses to the cathode of the gate tube. Thus, during the first half of each negative pulse, the cathode of the gate tube is negative and the screen grid is positive, permitting conduction through the gate tube in accordance with the condition of the cable capacitance. During the second part of the negative pulse, the screen grid is negative and hence the tube cannot conduct but electrons can flow from the negative cathode to the cable capacitance and hence charge the latter rapidly. By proper selection of the values of the resistor 18 associated with the screen grid and of the capacity 20 coupling the screen grid to the multivibrator circuit, the timing and duration of the positive pulses to the screen grid can be controlled to effect the above described result.

The circuit of Fig. 1 includes also means for increasing the sensitivity of the circuit after deenergization of the relay 48. These means comprise a variable resistor 66 connected in series with a condenser 68 between the anode of the amplifier 32 and a front contact 70 of the relay. When the relay releases, as a result of incidence of light of a predetermined magnitude, the circuit through the resistor 66 and capacity 68 is open, thereby increasing the sensitivity of the circuit to prevent release of the dimming switch when the approaching car dims its headlights.

The invention has now been described with reference to a single embodiment thereof. Certain features of the present circuit as, for example, the means for increasing the sensitivity of the circuit after release of the relay, are not claimed herein as they form subject matter of claims in the said co-pending applications. The present invention as heretofore described is concerned primarily with the means for increasing the speed of recharge of the cable capacitance between the photo-electric tube and the gate tube.

The following is claimed:

1. A light sensitive circuit comprising in combination a photo-electric tube having a light sensitive element, an electronic tube having a positively biased cathode, a control grid, a screen grid and an anode, a lead connecting said element and said control grid, a grounded shield for said lead providing therewith current accumulating means adapted to be negatively charged from said cathode when the positive bias thereof is removed and to dissipate such negative charge through said photo-electric tube at a rate dependent upon the intensity of the light incident on said element, means for intermittently negatively pulsing said cathode and means connected to said screen grid for preventing conduction through said electronic tube during part only of each negative pulse impressed on the cathode to insure rapid recharge of said accumulating means when light ceases to fall on said element.

2. The circuit according to claim 1 wherein said last mentioned means includes means normally negatively biasing said screen grid and means for intermittently positively pulsing said screen grid in timed relation with the negative pulses applied to the cathode of said electronic tube.

3. The circuit according to claim 2 including a multivibrator and connections therefrom to said cathode and screen grid for providing the respective negative and positive pulses thereto.

4. In a light sensitive circuit of the type wherein the condition of charge of current accumulating means connected to the photo cathode of a photo-electric tube and to a control grid of an electronic tube is determined by the intensity of light incident on the photo cathode and controls the magnitude of the negative voltage pulse appearing at the anode of the electronic tube when a negative pulse is impressed upon the cathode of the electronic tube, the improvement which comprises means for insuring rapid recharge of said accumulating means from said cathode, said means including a negatively biased screen grid in said electronic tube and means for intermittently positively pulsing said screen grid to permit conduction through said tube during part only of each negative pulse impressed on the cathode.

5. A light sensitive circuit comprising in combination current accumulating means, a gate tube having a positively biased and intermittently negatively pulsed cathode, a control grid, a screen grid and an anode, a photo-electric tube, said accumulating means being connected to said photoelectric tube and to said control grid to be negatively charged from said cathode when the cathode is pulsed and to have its charge dissipated through said photoelectric tube at a rate dependent upon the intensity of light incident on said photo-electric tube, means coupled to said screen grid for blocking said tube during part only of each negative pulse impressed on said cathode to insure rapid recharge of said accumulating means, and alternating current amplifying means for amplifying negative pulses appearing at said anode when said gate tube conducts.

References Cited in the file of this patent

UNITED STATES PATENTS

| | | |
|---|---|---|
| 2,100,755 | Shepard | Nov. 30, 1937 |
| 2,178,985 | Blumlein | Nov. 7, 1939 |
| 2,476,389 | Schmidt | July 19, 1949 |
| 2,515,630 | Chang | July 18, 1950 |
| 2,578,525 | Erickson | Dec. 11, 1951 |
| 2,645,724 | Rajchman et al. | July 14, 1953 |